(12) United States Patent
Sakuragi et al.

(10) Patent No.: US 8,864,890 B2
(45) Date of Patent: Oct. 21, 2014

(54) CLOG INDICATING DEVICE IN A DUST COLLECTOR

(75) Inventors: Satoshi Sakuragi, Tsushima (JP); Yoshifumi Kamakura, Tsushima (JP)

(73) Assignee: Aoiseiko Co., Ltd., Aichi (JP)

( * ) Notice: Subject to any disclaimer, the term of this patent is extended or adjusted under 35 U.S.C. 154(b) by 140 days.

(21) Appl. No.: 13/586,972

(22) Filed: Aug. 16, 2012

(65) Prior Publication Data
US 2013/0074699 A1    Mar. 28, 2013

(30) Foreign Application Priority Data

Sep. 26, 2011  (JP) ................ P2011-209531

(51) Int. Cl.
*B01D 46/46* (2006.01)
*B01D 46/00* (2006.01)
*B01D 46/42* (2006.01)

(52) U.S. Cl.
CPC ............ *B01D 46/42* (2013.01); *B01D 46/0086* (2013.01); *Y10S 55/34* (2013.01); *Y10S 116/25* (2013.01)
USPC .......... 96/417; 96/421; 55/DIG. 34; 116/266; 116/268; 116/272; 116/DIG. 25

(58) Field of Classification Search
USPC ....... 55/283, 471, 472, 473, DIG. 34; 96/114, 96/117, 421, 422; 73/38, 713, 714; 116/266, 268, 272, DIG. 25
See application file for complete search history.

(56) References Cited

U.S. PATENT DOCUMENTS

| | | | | |
|---|---|---|---|---|
| 3,052,207 A | * | 9/1962 | Lewis | 340/607 |
| 3,263,403 A | * | 8/1966 | Ladusaw | 96/421 |
| 5,131,932 A | * | 7/1992 | Glucksman | 96/422 |
| 6,412,435 B1 | * | 7/2002 | Timmons, Jr. | 116/70 |
| 6,604,486 B1 | * | 8/2003 | Krisko et al. | 116/268 |
| 6,743,281 B1 | * | 6/2004 | Miller | 96/416 |
| 2007/0277592 A1 | * | 12/2007 | Johansson et al. | 73/38 |

FOREIGN PATENT DOCUMENTS

JP  5-285325 A  11/1993

* cited by examiner

*Primary Examiner* — Duane Smith
*Assistant Examiner* — Minh-Chau Pham
(74) *Attorney, Agent, or Firm* — Cheng Law Group, PLLC

(57) ABSTRACT

A clog indicating device indicating clogging of a dust collecting filter in a dust collector is disclosed. The dust collector includes on an upper region of its casing an exhaust port opening upward, and a cover member is mounted interspatially above the exhaust port. A colored indicating float is so located as to be movable upward between the exhaust port and the cover member due to pressure of an air exhausted from the exhaust port. Clogging of a dust collecting filter is indicated according to a degree of exposure or a position in an up and down direction of the indicating float between the exhaust port and the cover member.

2 Claims, 6 Drawing Sheets

CLOG INDICATING DEVICE IN A DUST COLLECTOR

CROSS REFERENCE TO RELATED APPLICATIONS

The Present application claims priority from Japanese Patent Application No. 2011-209531 of Sakuragi et. al., filed on Sep. 26, 2011, the disclosure of which is hereby incorporated into the present application by reference.

BACKGROUND OF THE INVENTION

1. Field of the Invention

The present invention relates to a clog detecting device that indicates clogging of a dust collecting filter in a dust collector for collecting dust laden fluid such as dust laden oil mist (including oil smoke) generated in a machine tool or the like in a shop.

2. Description of Related Art

In a shop doing machine work, machine tools generate dust laden oil mist or the like. If left untreated, the oil mist not only makes working environment of the shop worse by causing bad odor in the shop, intrusion of the dust laden fluid into equipment and its control panels and dirt of walls, but also makes the floor of the shop slippery, which may cause fall of operators.

For this reason the dust laden fluid is required to be collected by a dust collector steadily and efficiently. To this end, such equipment as machine tools generating dust laden oil mist are usually provided with a dust collector that collects dust laden fluid with a dust collecting filter.

As the dust collecting filter collects the dust laden fluid, it is clogged due to collected dust laden fluid, which turns down collection efficiency of the filter and lets uncollected dust laden fluid released in the shop, thus making the working environment worse as described above.

This must be solved by frequent maintenance and inspection of the dust collecting filters, but it is difficult for a busy shop worker to watch the filters all of the time and clean or replace the filters as soon as they are clogged. JP 5-285325 A and so on discloses a device for monitoring clogging of a dust collecting filter in order to cope with such circumstances. The device includes in a suction chamber a pressure sensor for detecting a suction pressure of a blower for dust collection such that a detection signal is fed and clogging of a filter is announced when the suction pressure in the suction chamber surpasses a predetermined pressure.

However, in addition to electric sensing by the pressure sensor, the above conventional clog monitoring device also uses a temperature sensor for monitoring clogging of the filter. Since the device monitors clogging by means of a temperature signal as well as a pressure detection signal, the device has a complicated structure with the sensors and their detection circuits, and costs a lot of money for manufacturing. Further, the device requires maintenance and inspection for the sensors and detection circuits.

There is also known a clog indicating device including a damper pivotally supported at an exhaust port of the dust collector, an index needle mounted on a rotary shaft of the damper such that clogging of a filter is indicated by the index needle when a rotation angle of the damper is reduced.

However, although the index needle is mounted on a lateral of the exhaust port of the dust collector, the needle is very thin and is not easily viewable in a large shop, therefore it is not easy for operators to notice of clogging.

SUMMARY OF THE INVENTION

An object of the present invention is to provide a clog indicating device in a dust collector that has a simple structure and is capable of indicating in an easily viewable fashion. The object of the invention will be achieved by a following clog indicating device in a dust collector:

The clog indicating device for indicating clogging of a dust collecting filter in a dust collector includes a cover member mounted interspatially above an exhaust port of the dust collector which port is located on an upper region of a casing of the dust collector and opening upward, and a colored indicating float that is movable upward between the exhaust port and the cover member due to a pressure of an air exhausted from the exhaust port. Clogging of a dust collecting filter is indicated according to a degree of exposure or a position in an up and down direction of the indicating float between the exhaust port and the cover member.

With this invention, the clog indicating device is easily constructed by locating the indicating float and cover member at the exhaust port of the dust collector, and the clog indicating device is capable of indicating clogging of dust collecting filters in an easily viewable fashion by the colored indicating float, at low cost. Further, since the device of the invention does not require any sensors or detecting circuit, it can be manufactured inexpensively, does not require maintenance and inspection, and rarely goes out of order.

The above clog indicating device may also be so configured that the support shaft is raised vertically at a center of the exhaust port and inserted through a through hole formed at the center of the indicating float to support the indicating float in such a manner that the indicating float is movable in an up and down direction, the cover member is mounted on top of the support shaft, and that the indicating float moves up and down along the support shaft according to a pressure of an air exhausted from the exhaust port.

With this configuration, the indicating float is movable in an up and down direction in a steady fashion according to the degree of clogging of filters with a relatively simple structure. Moreover, since the support shaft penetrates the center of the indicating float such that the indicating float can slide up and down along the support shaft, the indicating float is movable steadily up and down according to clogging of the filters to indicate clogging of the filters.

Furthermore, it is desired that the indicating float is fabricated of foamed synthetic resin or of a hollow synthetic resin body so as to be light. This configuration will make pressure loss in the exhausted air from the dust collector minimum.

DESCRIPTION OF PREFERRED EMBODIMENTS

Figure 1:
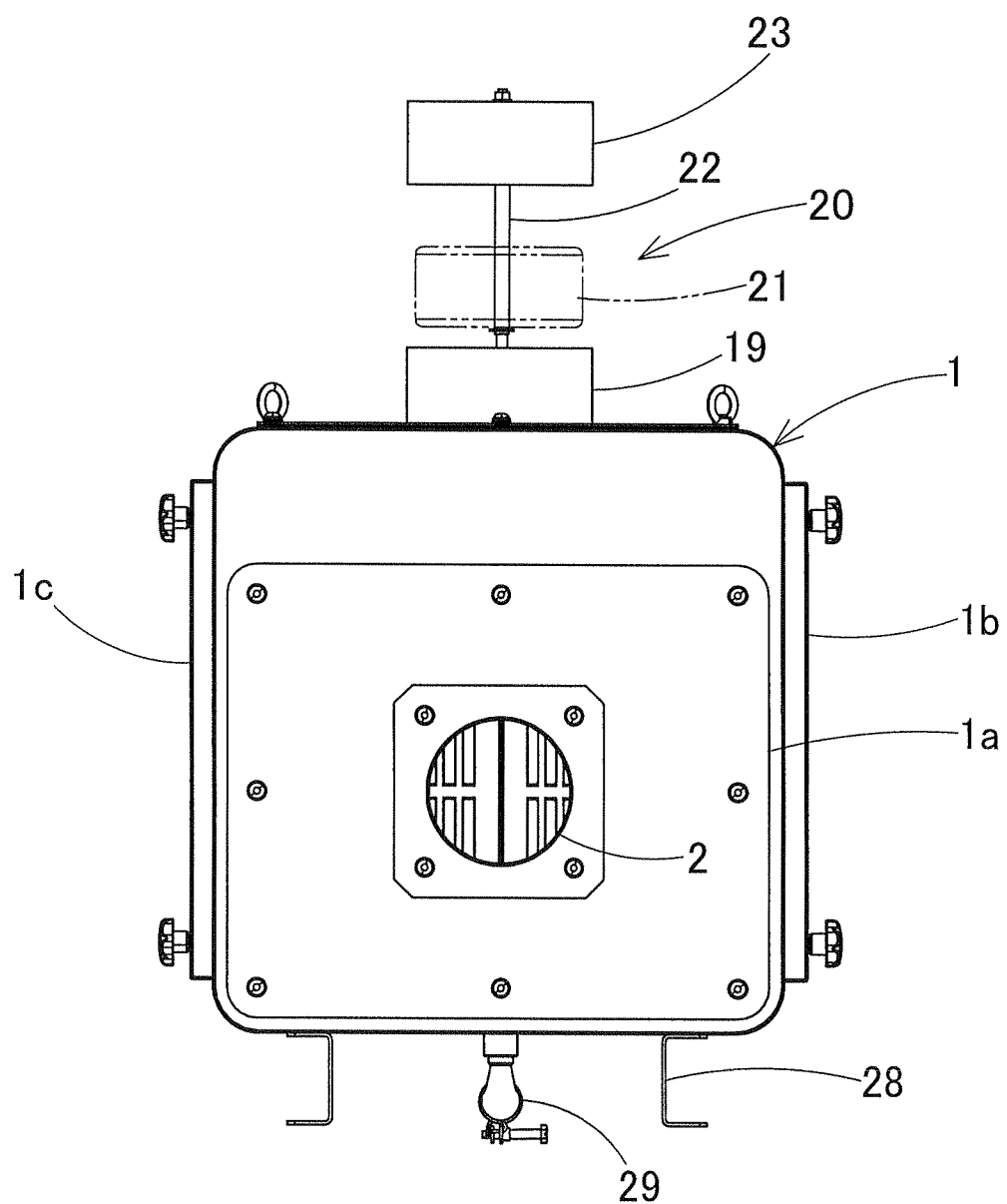
FIG. 1 is a front view of a dust collector equipped with a clog indicating device embodying the invention.
Figure 2:
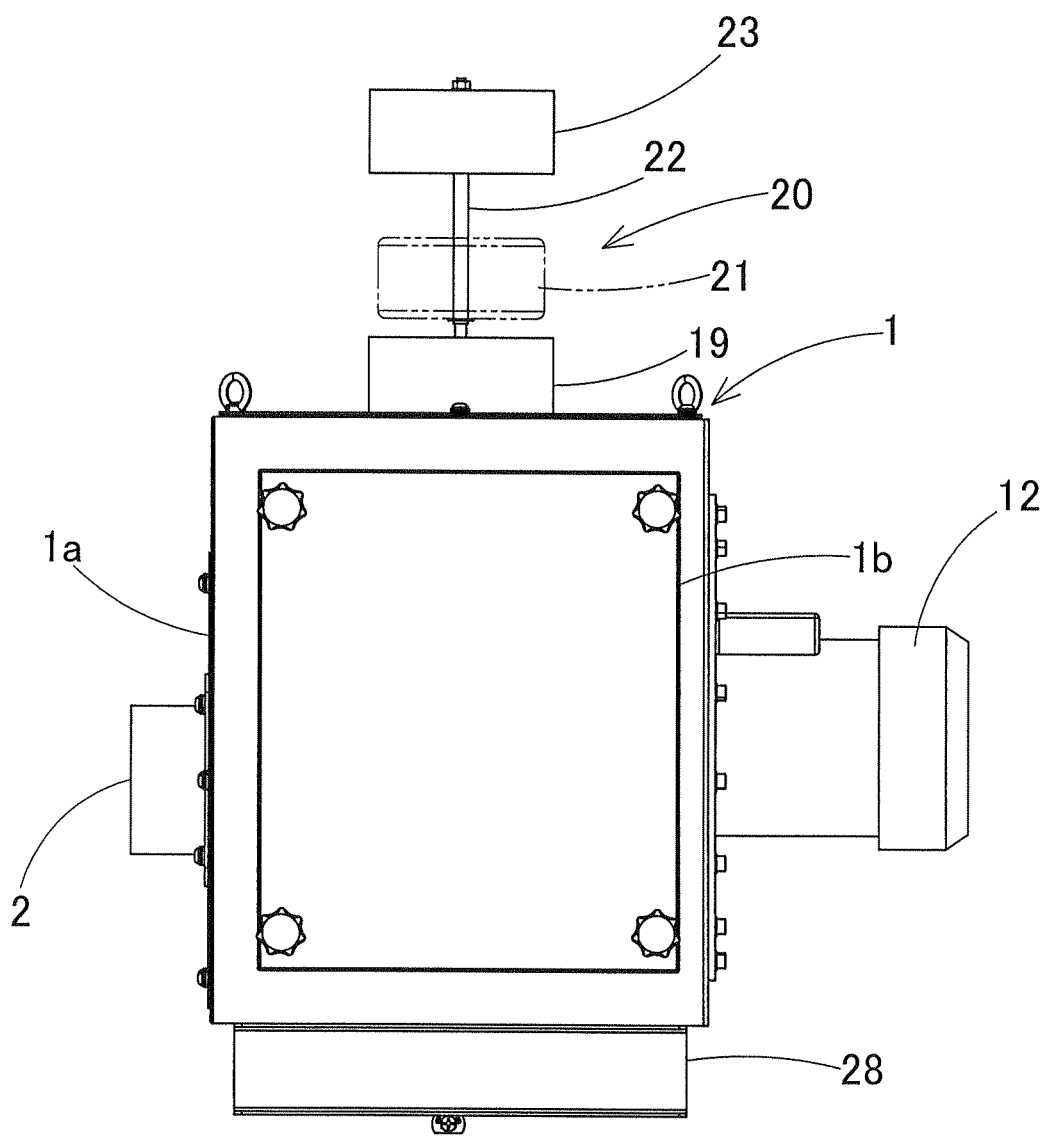
FIG. 2 is a right side view of the dust collector of FIG. 1.
Figure 3:
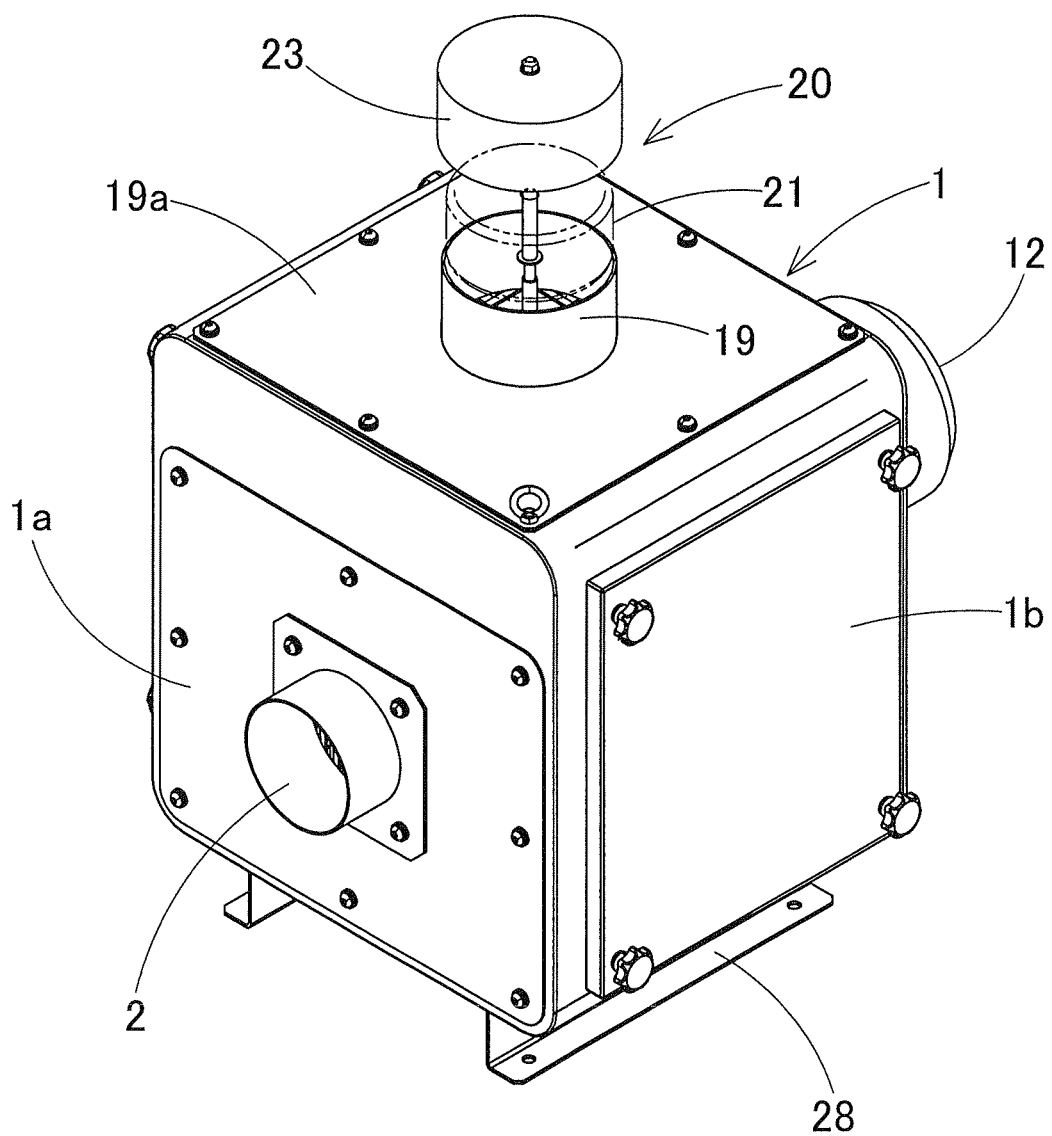
FIG. 3 is a perspective view of the dust collector of FIG. 1.

A preferred embodiment of the present invention is described below with reference to the accompanying drawings. However, the invention is not limited to the embodiments disclosed herein. All modifications within the appended claims and equivalents relative thereto are intended to be encompassed in the scope of the claims.

FIGS. 1 to 4 show a dust collector that collects dust laden fluid such as oil mist (including oil smoke), which contains fine dust generated in a machine tool in a machine shop.

Schematically, the dust collector is comprised of a generally rectangular parallelepiped casing 1 provided with a suction port 2 on the front. The casing 1 internally includes a main filter 5 as a dust collecting filter, a suction chamber 3 communicating with the suction port 2, an aspiration chamber 8 communicating with the suction chamber 3, an aspiration device 10 mounted on a back side of the casing 1 such that a fan 11 is located in the aspiration chamber 8, an exhaust chamber 17 that is located above the suction chamber 3 and aspiration chamber 8 and partitioned from the suction chamber 3 and aspiration chamber 8 with a partition wall 16, and an exhaust port 19 located on top of the exhaust chamber 17. Further, a clog indicating device 20 is so formed as to protrude upward from the exhaust port 19 for indicating clogging of the dust collecting filter.

Figure 4:
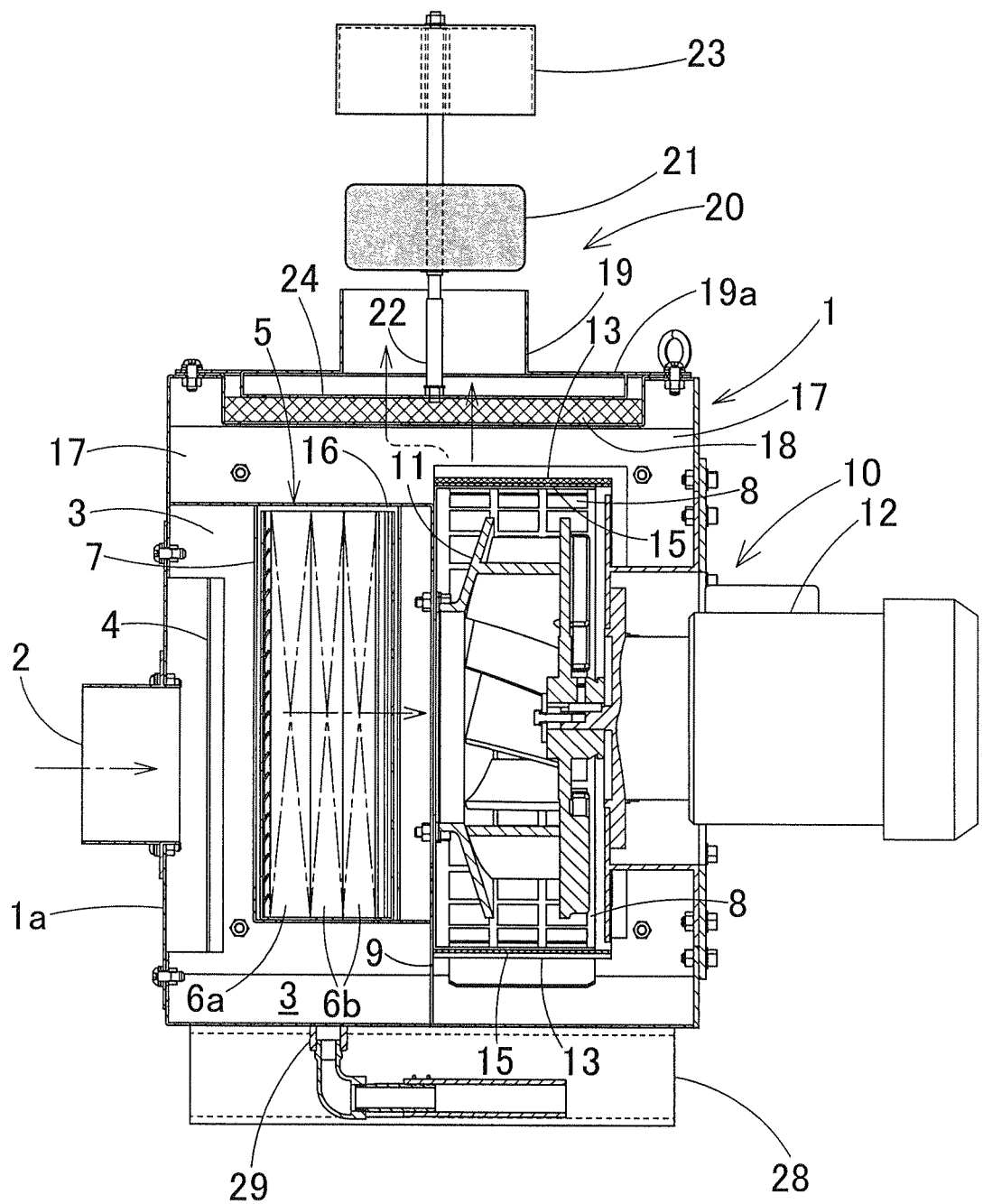
FIG. 4 is a vertical sectional view of the dust collector of FIG. 1.

The casing 11 is formed into a generally rectangular parallelepiped box, and has a suction port cover 1a on the front side. The cover 1a is detachably secured to the front side with fixing screws and has the suction port 2 at the center. As shown in FIG. 4, a baffle plate 4 and a main filter 5 are located in the suction chamber 3 communicating with the suction port 2. The baffle plate 4 receives a dust laden fluid taken into the dust collector with its metal louver and collects oil mist, fine dust or the like contained in the fluid as preprocessing. A drain 29 is connected to a bottom wall of the suction chamber 3 for letting out dust laden fluid such as oil.

As shown in FIG. 4, the main filter 5 is comprised of a cartridge box 7 and a plurality of demister 6a and/or dust collecting filter 6b set in the cartridge box 7 in layers. The casing 1 is provided on both lateral sides with a side cover 1b/1c which are removably fixed to the lateral side with simple screws, such that the main filter 5, i.e., the cartridge box 7, the demister 6a and filter(s) 6b together, may be easily taken out by removing either one of the side covers 1b/1c.

The aspiration chamber 8 communicating with the suction chamber 3 is formed into a drum. A drum filter 13 is mounted around an outer circumference of the aspiration chamber 8, which serves as a dust collecting filter. The aspiration chamber 8 adjoins the suction chamber 3, and between the aspiration chamber 8 and suction chamber 3 is a partition wall 9 provided with a round opening. A fan 11 of the aspiration apparatus 10 is inserted into the aspiration chamber 8 from the back side of the casing 1. The fan 11 is fixed to a rotary shaft of the motor 12, and the motor 12 is secured to the backside of the casing 1. The aspiration apparatus 10 runs the fan 11 and aspirates a dust laden fluid toward the aspiration chamber 8 from the suction chamber 3, and forwards the fluid toward the exhaust chamber 17, which is located there above, through the drum filter 13 arranged around the aspiration chamber 8.

As shown in FIG. 4, the drum filter 13 is comprised of a filter support 15 which is secured inside the casing 1 and formed into a tubular net and a flexible sheeted filter, such as a cloth like filter or a nonwoven fabric filter, mounted around the filter support 15. The filter support 15 is mounted on the partition wall 9 of the aspiration chamber 8. The flexible sheeted filter can be easily replaced by removing the side cover 1b or 1c of the casing 1. A fluid aspirated into the aspiration chamber 8 by running of the fan 11 of the aspiration apparatus 10 is forwarded to the exhaust chamber 17 located outside of the aspiration chamber 8, through the drum filter 13.

The exhaust chamber 17 extends from a circumference of the aspiration chamber 8 to an upper region of the casing 1. As shown in FIG. 4, a discharge filter 18 is located at an upper region of the exhaust chamber 17, and an exhaust port cover 19a having an exhaust port 19 is located above the discharge filter 18. The discharge filter 18 is formed of a filter element which is capable of collecting fine mist and dust of about 0.3 to 2 μm.

As shown in FIG. 1, the exhaust port 19 is so formed as to open vertically upward. A dust laden fluid sucked in via the suction port 2 passes through the main filter 5 in the suction chamber 3, the drum filter 13 mounted around the aspiration chamber 8 and the discharge filter 18 while being freed from oil mist, fine dust and so on, then the filtrated air is exhausted upward via the exhaust port 19. Although the discharge filter 18 illustrated in FIG. 4 is a single-layered simple filter, it may alternatively be replaced with a high performance filter which is a multi-layered fine fiber cloth-like filter element.

As the main filter 5, drum filter 13 and discharge filter 18 get clogged due to collected oil mist and fine dust, the flow rate and pressure of the exhausted gas turn down. Above the exhaust port 19, there is mounted a clog indicating device 20 that indicates clogging of the filters using the decrease of the flow rate and pressure of the exhausted gas along with clogging of the filers.

Figure 5:
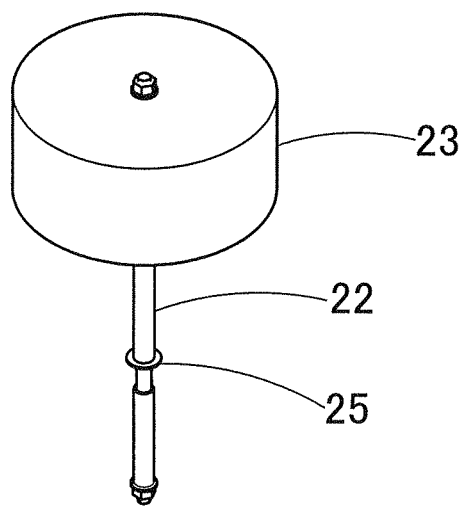
FIG. 5 is an exploded perspective view of the clog indicating device.
Figure 5:
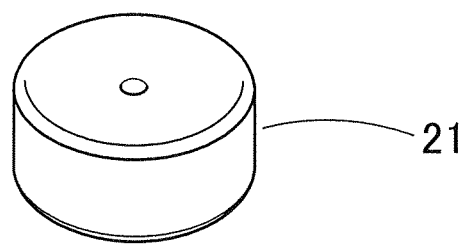
Figure 5:
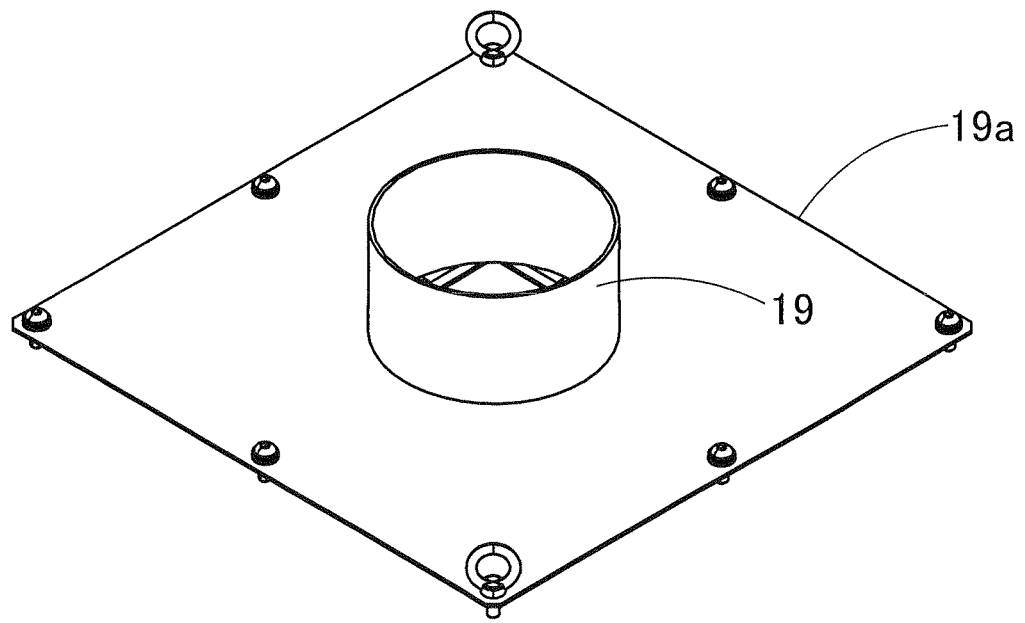
Figure 6:
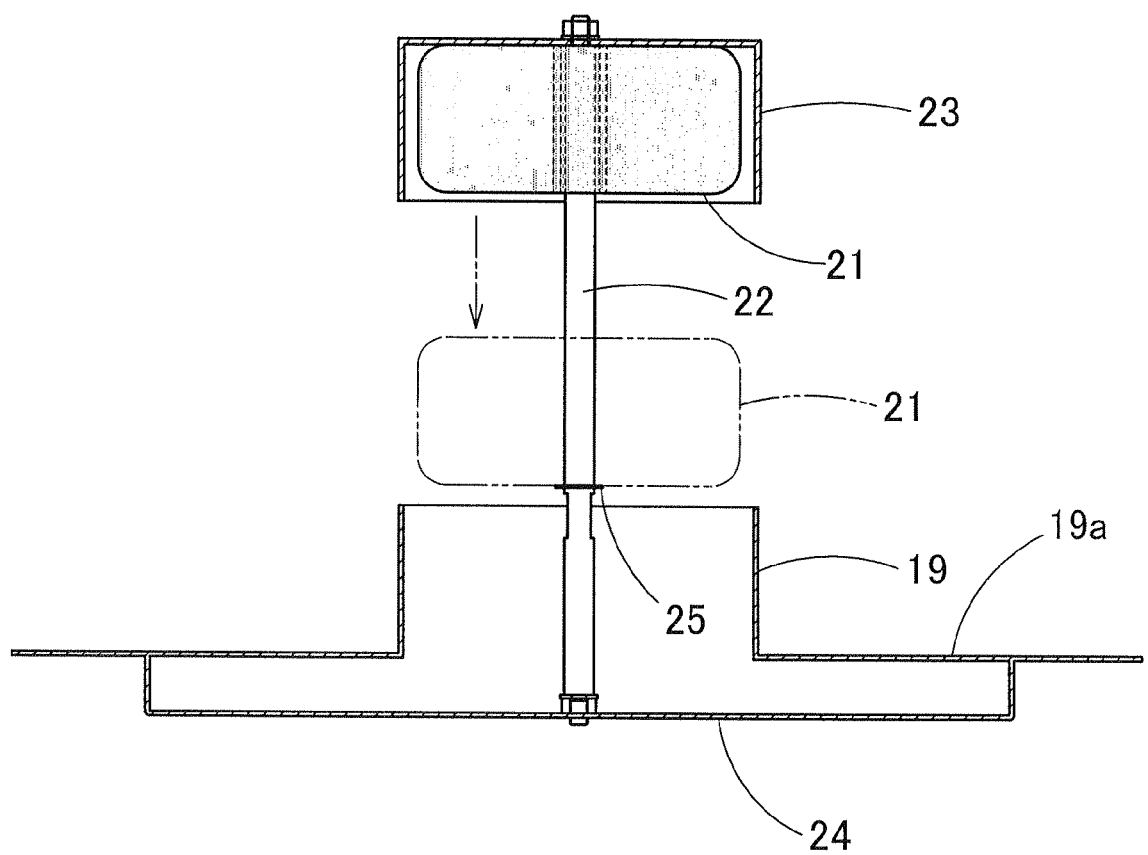
FIG. 6 is a sectional view of the clog indicating device.

Referring to FIGS. 5 and 6, the clog indicating device 20 includes a cover member 23 that is interspatially mounted above the exhaust port 19 and a colored indicating float 21 that is movable upward between the exhaust port 19 and the cover member 23 due to a pressure of a gas exhausted from the exhaust port 19. Clogging of a dust collecting filter is indicated by the degree of exposure or by the position in an up and down direction of the indicating float 21 between the cover member 23 and the exhaust port 19.

A support shaft 22 is raised vertically at the center of the exhaust port 19, and the cover member 23 is mounted on top of the support shaft 22 for housing the indicating float 21. The support shaft 22 is so configured as to be vertically secured to a metal mesh 24 arranged inside the exhaust port cover 19a with fixing screws or the like, and therefore, the clog indicating device 20 can be mounted on an existing dust collector as long as the dust collector has an exhaust port that exhausts upward.

The indicating float 21 is fabricated, by way of example, of foamed synthetic resin or formed into a hollow body from synthetic resin so as to be considerably light. The float 21 includes at the center a through hole running through vertically such that the support shaft 22 goes there through and the float 21 is supported by the support shaft 22 in an up-and-down movable manner. As best shown in FIG. 6, the support shaft 22 is provided at its intermediate low region with a holder (washer) 25. The holder 25 holds the indicating float 21, which would otherwise slide down under its own weight, at an adequate intermediate exposure position. As best shown in FIG. 4, the holder 25 is so positioned as to hold the indicating float 21 at such a position that an adequate gap is formed between the exhaust port 19 and the indicating float 21 and the exhaust port 19 is open and air-releasable even when the float 21 is at the down end position.

The indicating float 21 is colored in an appealing color such as red, at least on the outer circumference. In a normal exhaust condition, the float 21 is pushed up enough to go inside the cover member 23, and the float 21 appears from underneath the cover member 23 due to decrease of the exhaust flow rate or the like. When there is no exhaust from the exhaust port 19, the indicating float 21 comes down under its own weight and rests on the holder 25, above the exhaust port 19.

That is, the indicating float 21 moves vertically in accordance with the flow rate and pressure of the exhaust from the exhaust port 19. When the main filter 5, drum filter 13 and/or the discharge filter 18 is clogged with oil mist and fine dust, the flow rate and pressure of the exhaust from the exhaust port 19 turn down, and accordingly the indicating float 21 appears from underneath the cover member 23 and indicates clogging of the filter(s).

Operation of the clog indicating device in a dust collector thus configured is now described. The dust collector is installed on or adjacent to such a machine tool as a machining center in a machine shop. An exhaust duct communicating with the machine tool is connected to the suction port 2. When the dust collector is not actuated and there is no exhaust, the indicating float 21 is held by the holder 25 above the exhaust port 19.

When the motor 12 of the aspiration device 10 is actuated to run the fan 11, the dust collector aspirates dust laden fluid to the aspiration chamber 8 via the suction chamber 3 and diffuses it in a radial direction, such that the fluid is forwarded to the exhaust chamber 17.

More specifically, dust laden fluid containing oil mist (including oil smoke) and fine dust, which the machine tool generates, enters into the suction chamber 3 via the suction port 2, and hits the baffle plate 4 firstly. At this time liquefied oil as well as larger dust are removed from the fluid and fall down. Then the dust laden fluid passes through the demister 6a and dust collecting filter 6b of the main filter 5, and is freed from oil mist and fine dust.

The fluid is then aspirated into the aspiration chamber 8 from the suction chamber 3, diffused radially due to running of the fan 11, and passes through the drum filter 13 and forwarded to the exhaust chamber 17. At this time the drum filter 13 collects oil mist and finer dust further, and the air freed from oil mist and fine dust in the exhaust chamber 17 passes through the discharge filter 18 and is exhausted upward from the exhaust port 19. The exhausted air pushes up and lifts the indicting float 21 from the position above the exhaust port 19, and the operating condition of the dust collector is indicated by the way the indicating float 21 floats.

If the main filter 5, drum filter 13 and discharge filter 18 of the dust collector have no clog, the exhausted air has sufficient flow rate and pressure to push up the indicating float 21 to the top end position such that it is housed inside the cover member 23 and kept in that state as shown in FIG. 6. That is, when the dust collecting filters have no clog and functions normally, the indicating float 21 is covered by the cover member 23 and is not visible.

In contrast, when the main filter 5, drum filter 13 and/or discharge filter 18 are/is clogged, there arises pressure loss in the exhausted air according to the degree of clogging, and the flow rate and pressure of the air exhausted from the exhaust port 19 turn down. Accordingly the indicating float 21 having been pushed up inside the cover member 23 comes down according to the degree of clogging, and the red (or colored) float 21 appears between the cover member 23 and the exhaust port 19.

Thus, an administrator of the machine shop can build an awareness of clogging of dust collecting filters easily and surely by seeing the degree of emergence of the indicating float 21. At recognition of clogging, the administrator can clean or replace the main filter 5, drum filter 13 and so on, and when the filters are thus unclogged, the indicating float 21 of the clog indicating device 20 is pushed up again by the exhaust with sufficient flow rate and pressure, and is covered by the cover member 23.

As described above, the clog indicating device 20 has a simple construction with the indicating float 21 and cover member 23 located at the exhaust port 19 of the dust collector, and is capable of indicating clogging of dust collecting filters in an easily viewable fashion by emergence of the indicating float 21, at low cost.

Moreover, since the support shaft 22 is provided to penetrate the center of the columnar indicating float 21 vertically such that the float 21 can slide up and down along the support shaft 22, the indicating float 21 is movable in a steady fashion according to the degree of clogging of filters. Further, since the device of the invention does not require any sensors or detecting circuit, it can be manufactured inexpensively, does not require maintenance and inspection, and rarely goes out of order. Furthermore, since the indicating float 21 is fabricated of foamed synthetic resin or of a hollow synthetic resin body and thus is very light, it will make the pressure loss in the exhausted air from the dust collector minimum, and will have as less adverse effect as possible on the pressure loss in the exhausted air.

What is claimed is:

1. A clog indicating device for indicating clogging of a dust collecting filter in a dust collector, the device comprising:
    a cover member mounted interspatially above an exhaust port of the dust collector which port is located on an upper region of a casing of the dust collector and opening upward; and
    a colored indicating float that is movable upward between the exhaust port and the cover member due to a pressure of an air exhausted from the exhaust port,
    wherein clogging of a dust collecting filter is indicated according to a degree of exposure or a position in an up and down direction of the indicating float between the exhaust port and the cover member,
    wherein the indicating float includes at a center a through hole that runs vertically through, and a support shaft is inserted through the through hole vertically,
    wherein the support shaft is raised vertically at a center of the exhaust port and inserted through the through hole of the indicating float to support the indicating float in such a manner that the indicating float is movable in an up and down direction, the cover member is mounted on top of the support shaft and the indicating float moves up and down along the support shaft according to a pressure of the air exhausted from the exhaust port, and
    wherein, when there is no exhaust from the exhaust port, the indicating float is held above the exhaust port by a holder that is mounted on an intermediate low region of the support shaft.

2. The clog indicating device as in claim 1, wherein the indicating float is formed of foamed synthetic resin or is a hollow body formed from synthetic resin.

* * * * *